United States Patent
Saino et al.

(10) Patent No.: US 9,094,823 B2
(45) Date of Patent: Jul. 28, 2015

(54) DATA PROCESSING FOR SECURING LOCAL RESOURCES IN A MOBILE DEVICE

(75) Inventors: Lorenzo Saino, Mortara (IT); Louis-Marie Le Saux, Paris (FR)

(73) Assignee: France Telecom, Paris (FR)

( * ) Notice: Subject to any disclaimer, the term of this patent is extended or adjusted under 35 U.S.C. 154(b) by 265 days.

(21) Appl. No.: 13/882,071

(22) PCT Filed: Oct. 21, 2011

(86) PCT No.: PCT/EP2011/068456
§ 371 (c)(1),
(2), (4) Date: Apr. 26, 2013

(87) PCT Pub. No.: WO2012/055786
PCT Pub. Date: May 3, 2012

(65) Prior Publication Data
US 2013/0219180 A1 Aug. 22, 2013

(30) Foreign Application Priority Data

Oct. 29, 2010 (EP) .................................... 10306195

(51) Int. Cl.
| | | |
|---|---|---|
| *H04W 12/06* | (2009.01) | |
| *G06F 21/42* | (2013.01) | |
| *H04L 9/32* | (2006.01) | |
| *H04W 12/08* | (2009.01) | |
| *H04W 12/12* | (2009.01) | |
| *H04L 29/06* | (2006.01) | |
| *H04W 88/02* | (2009.01) | |

(52) U.S. Cl.
CPC .............. *H04W 12/06* (2013.01); *G06F 21/42* (2013.01); *H04L 9/3271* (2013.01); *H04W 12/08* (2013.01); *H04L 63/1466* (2013.01); *H04L 2209/80* (2013.01); *H04W 12/12* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 7,966,000 | B2 * | 6/2011 | Semple et al. | 455/411 |
| 2007/0079142 | A1 * | 4/2007 | Leone et al. | 713/193 |
| 2010/0043063 | A1 * | 2/2010 | Ueda et al. | 726/6 |
| 2011/0086616 | A1 * | 4/2011 | Brand et al. | 455/411 |

FOREIGN PATENT DOCUMENTS

| | | | |
|---|---|---|---|
| WO | 2005041605 A1 | | 5/2005 |
| WO | WO 2005041605 A1 | * | 5/2005 |
| WO | 2007036024 A1 | | 4/2007 |
| WO | WO 2007036024 A1 | * | 4/2007 |

OTHER PUBLICATIONS

International Search Report and Written Opinion dated Nov. 2, 2011 for corresponding International Application No. PCT/EP2011/068456, filed Oct. 21, 2011.

* cited by examiner

*Primary Examiner* — Andrew Nalven
*Assistant Examiner* — Christopher Ruprecht
(74) *Attorney, Agent, or Firm* — David D. Bush; Westman, Champlin & Koehler, P.A.

(57) ABSTRACT

A method of data processing for securing local resources in a mobile device. The method includes: a) when network connectivity is available: coupling the mobile device with a first identity module associated to a first International Mobile Subscriber Identity (IMSI), receiving in the first identity module a network challenge from a communication network, ciphering the network challenge using a secret key, and sending a corresponding response to the network for subsequent successful authentication, b) after a successful authentication to the communication network: associating at least a part of the local resources to the first IMSI, and storing, in a database of the mobile device, authentication data related to the challenge/response duplet, granting access to local resources associated to the first IMSI.

16 Claims, 12 Drawing Sheets

DATA PROCESSING FOR SECURING LOCAL RESOURCES IN A MOBILE DEVICE

CROSS-REFERENCE TO RELATED APPLICATIONS

This Application is a Section 371 National Stage Application of International Application No. PCT/EP2011/068456, filed Oct. 21, 2011, which is incorporated by reference in its entirety and published as WO 2012/055786 on May 3, 2012, in English.

STATEMENT REGARDING FEDERALLY SPONSORED RESEARCH OR DEVELOPMENT

None.

THE NAMES OF PARTIES TO A JOINT RESEARCH AGREEMENT

None.

TECHNICAL FIELD

The present invention generally relates to security of mobile devices. More specifically, it relates to devices and methods for providing mandatory access control, integrity and confidentiality to local resources of a mobile device based on identity module security information in offline contexts. Identity module may be a Subscriber Identity Module (SIM), a Universal Subscriber Identity Module (USIM), a Removable User Identity Module (RUIM), or a CDMA Subscriber Identity Module (CSIM).

BACKGROUND

The average feature-set of mobile phones available in the market has steadily increased over last years, driven by both technological advances and market demand. As a result of this trend, nowadays, the most capable mobile devices, sometimes referred to as smartphones, are capable of executing a large number of tasks, in addition to classic telephony services. Such features include, for instance, accessing the Internet, running relatively computation-intensive applications, playing or recording a plurality of media contents and store large amounts of data. Subsequently, the larger set of functionalities being provided by mobile devices has led to a change in mobile phones usage by end users.

One of these changes is represented by contents that users are storing on their devices. In fact, end users are now capable of storing locally on mobile phones an increasing amount of data, some of which can be very sensitive. Examples include emails, documents, photos, videos, passwords and other authentication credentials. Even in cloud computing contexts, where large part of the computation and storage is executed by server-side applications, mobile devices still store a considerable amount of sensitive information, such as authentication credentials and data which are locally cached for performance and availability reasons.

Since devices can be very easily subject to theft or loss, the security of data and, more generally, of any other local resource of a mobile device, such as applications or hardware components, is a considerably important matter. For this reason, the increasing amount of locally available resources on mobile devices is resulting in tighter security requirements to appropriately protect them.

Currently, in 3GPP-compliant mobile phones, security can be provided by the utilisation of a Subscriber Identification Module (SIM) or a Universal Subscriber Identification Module (USIM) installed on a tamper-resistant integrated circuit card, sometimes referred to as Smart Card. A (U)SIM can be used to mutually authenticate a mobile subscriber and a mobile network and to provide confidentiality, integrity, authenticity and non-repudiation to the data exchanged between a mobile phone and a 3GPP-compliant mobile network.

(U)SIMs provide an appropriate level of security for accessing mobile network services. In fact, differently from username/password authentication credentials, which provide "something-you-know" one-factor authentication, (U)SIM applications on smart cards provide a stronger "something-you-have" authentication. Furthermore, (U)SIM security can be increased through the setting of a Personal Identification Number (PIN) to protect access to the card to unauthorised users, thus enabling the (U)SIM to provide two-factor authentication. In conclusion, another noteworthy security feature of a (U)SIM consists in the capability to be deactivated remotely by a mobile network operator.

However, the use of authentication mechanisms based on (U)SIM as means for securing local resources on a mobile device presents considerable limitations.

First, (U)SIM-based authentication cannot be executed if no network connection is available. In fact, both GSM and UMTS Authentication and Key Agreement (AKA) protocols require the availability of a mobile network to generate an authentication challenge and to validate the response provided by the (U)SIM.

Second, an attacker can run an AKA authentication between a spoofed (U)SIM and a spoofed mobile network to induce the device into believing that the (U)SIM is genuine and therefore authorizing access to local resources.

Third, (U)SIM-based authentication protocols do not provide appropriate mechanisms to encrypt/decrypt locally stored files and to verify their integrity.

Nevertheless, a person skilled in the art would recognise that these capabilities could potentially be provided by a specific additional applet installed on a SIM card or a Universal Integrated Circuit Card (UICC). However, this would require specific cards to be issued, which would represent a serious limitation for a large scale deployment. In fact, it would require the replacement of the cards currently deployed or to install the applet over the air and both procedures would be considerably expensive. In addition, in case also online security features are required, such as remote deactivation and online authentication when network connectivity is available, a dedicated network infrastructure would be required, with a further increase in both capital and operational costs.

WO-2007/036024 discloses a method for providing authentication of a user of a recipient unit when the recipient unit is offline. The method includes storing one or a plurality of challenge-reply sets associated with an article based on an online communication with a sender unit. Each of the challenge-reply sets includes at least a challenge-reply pair for use in offline authentication of the user for a particular resource available through the recipient unit.

However, the method disclosed in this document does not recite the adaptation to an identity module environment. In other words, this method does not permit the authentication within the framework of a separate module.

Embodiments of the present invention will improve the situation.

SUMMARY

To address these needs, a first aspect of the present invention relates to a method of data processing for securing local resources in a mobile device. The method comprises:
a) when network connectivity is available:
coupling the mobile device with a first identity module associated to a first International Mobile Subscriber Identity (IMSI),
receiving in the first identity module a network challenge from a communication network, ciphering the network challenge using a secret key, and sending a corresponding response to the network for subsequent successful authentication,
b) after a successful authentication to the communication network:
associating at least a part of the local resources to the first IMSI, and
storing, in a database of the mobile device, authentication data related to the challenge/response duplet,
granting access to local resources associated to the first IMSI,
c) when network connectivity is not available:
coupling the mobile device with a second identity module associated to a second IMSI,
sending a challenge to the second identity module, said challenge being determined from the authentication data stored in the database,
receiving a response from the second identity module,
comparing the response received with the stored authentication data, and granting access to local resources associated to the second IMSI if the response received from the second identity module matches a response associated to the sent challenge in the database.

This method aims to enforce the security of local resources of the mobile device.

Step a) may comprise a passive collection of authentication data comprising:
collecting a response from the first identity module, and
determining, from the ciphered challenge, an offline authentication expected response,
Step b) comprising storing in the database the network challenge and the corresponding offline authentication expected response.

In other embodiments of the invention, step b) may comprise an active collection of authentication data comprising:
verifying that the first identity module has previously been authenticated by the network,
sending to the first identity module a challenge determined from the database and collecting the corresponding response,
determining, from the response, an offline authentication expected response, and
storing in the database the challenge and the corresponding offline authentication expected response.

Authentication data stored in the database may comprise a set of records, each record comprising:
an IMSI of an identity module,
an Integrated Circuit Card ID (ICCID) of the card on which the said identity module is installed,
a challenge used to generate the authentication data,
a corresponding offline authentication expected response calculated from a response from the identity module,
a flag indicating whether the validity of the authentication data is verified against combined identity module and network spoofing attacks,
a flag indicating whether the authentication data has been collected actively or passively,
a number of times the challenge has been replayed in offline contexts, and/or
a timestamp related to the time when the challenge/response duplet has been collected.

Step c) may comprise:
checking the IMSI of the second identity module, and, if it does not match with an IMSI that needs to be authenticated,
reading the value of the ICCID of the card on which the second identity module is installed, and, if this ICCID matches with the value of the ICCID of the card on which the requested identity module is supposed to be installed,
selecting another identity module present on the said card.

Step a) may comprise:
authenticating the communication network with the mobile device, and
authenticating the first identity module with the communication network.

In other embodiments of the invention, step a) may comprise:
authenticating the first identity module with the communication network, and
offline authenticating the first identity module with the mobile device.

If more than one challenge/response duplets are stored in the database, step c) may comprise:
selecting in the database all the records where the value of the IMSI matches with the IMSI of the second identity module,
assigning a security index $S_i$ to each of the selected records, the security index $S_i$ depending on the number of times the record has already been replayed and on the fact that the record has been collected actively or passively,
sorting all the selected records in descending order of the security index $S_i$, and
selecting a record to be used according to a probability distribution.

For example, the probability distribution may have a probability density function equal to:

$$p(i) = \frac{s_i}{\sum_{k=1}^{N} s_k}$$

$$i \in N$$

$$1 \le i \le N \le 10$$

where i=1 corresponds to the first element of the list and i=N corresponds to the last element of the list and $S_i$ is the security index of the element at index i.

The method may comprise using an identity module security algorithms in order to generate:
a cipher key to encrypt/decrypt at least a part of the local resources,
an integrity key to generate/verify Message Authentication Codes (MAC).

Moreover, at least a part of the local resources may be further protected with a password provided by a user.

The first identity module and the second identity module may be Subscriber Identity Modules (SIM), Universal Subscriber Identity Modules (USIM), Removable User Identity Modules (RUIM), or CDMA Subscriber Identity Modules (CSIM).

An IMSI of an identity module to be authenticated may be predetermined.

In other embodiments of the invention, an IMSI of an identity module to be authenticated may be implicit and correspond to an IMSI of an identity module selected at the moment the authentication step is initiated.

A second aspect of the present invention relates to a computer program product comprising one or more stored sequences of instructions that are accessible to a processor and which, when executed by the processor, cause the processor to carry out the steps of the method described above.

A third aspect of the present invention relates to a mobile device comprising local resources, and a security manager module configured to secure access to at least a part of the local resources, the mobile device being configured to:
a) when network connectivity is available:
   being coupled with a first identity module associated to a first International Mobile Subscriber Identity (IMSI),
   receiving in the first identity module a network challenge from a communication network, ciphering the network challenge using a secret key, and sending a corresponding response to the network for subsequent successful authentication,
b) after a successful authentication to the communication network:
   associating at least a part of the local resources to the first IMSI, and
   storing, in a database of the security manager module, authentication data related to the challenge/response duplet,
   granting access to local resources associated to the first IMSI,
c) when network connectivity is not available:
   being coupled with a second identity module associated to a second IMSI,
   sending a challenge to the second identity module, said challenge being determined from the authentication data stored in the database,
   receiving a response from the second identity module,
   comparing the response with the stored authentication data, and granting access to local resources associated to the second IMSI if the response received from the second identity module matches the response associated to the sent challenge in the database.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

Embodiments of the invention deal with the problem of enforcing security of local resources of a Mobile Equipment (ME).

Figure 1:
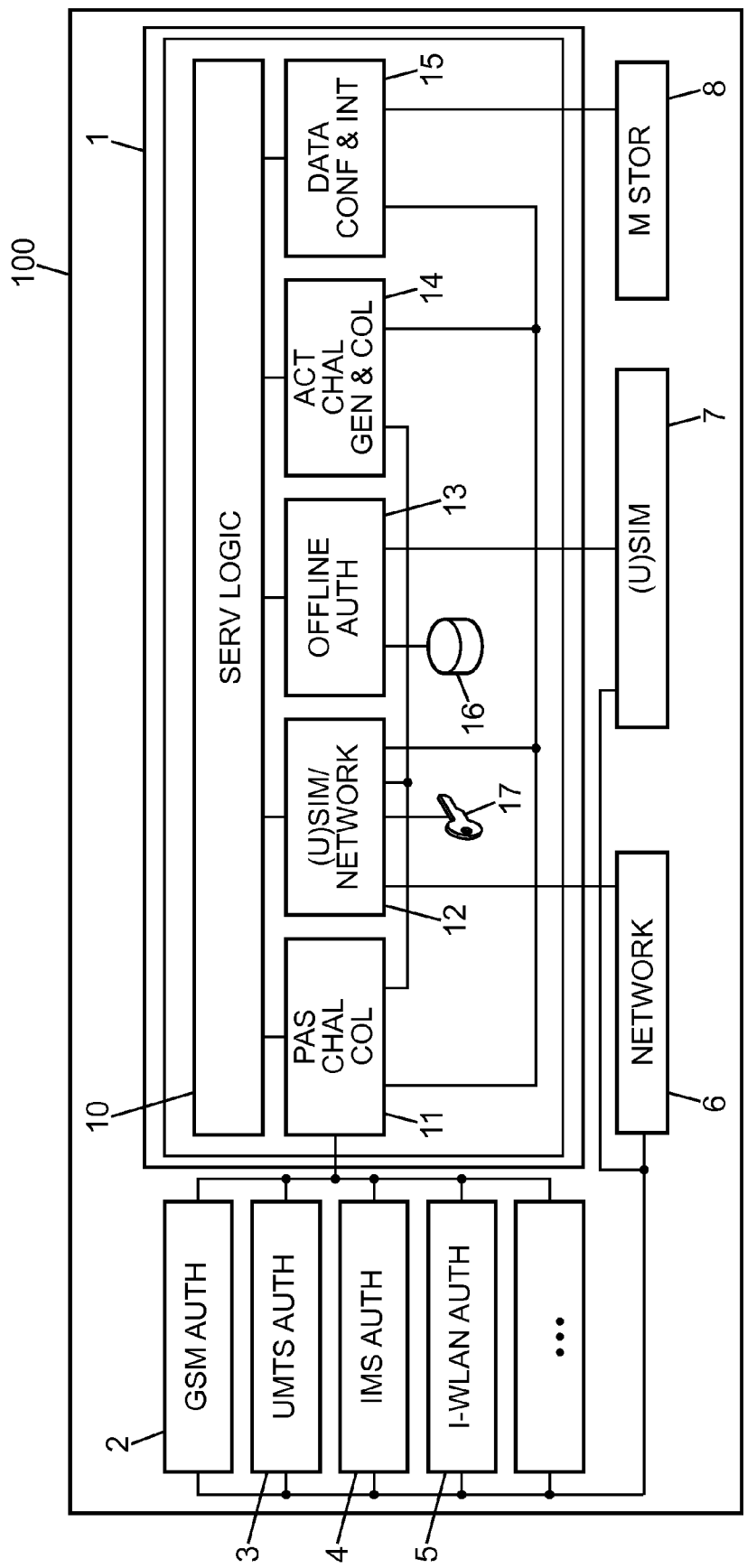
FIG. 1 is a schematic block diagram of a Mobile Equipment comprising a security manager according to an embodiment of the invention.

FIG. 1 represents a security manager 1, embedded in a 3GPP-compliant Mobile Equipment (ME) 100 comprising a set of authentication components configured to provide authentication, for example a GSM (Global System for Mobile Communications) authentication component 2, an UMTS (Universal Mobile Telecommunications System) authentication component 3, an IMS (IP Multimedia Subsystem) authentication component 4, and an I-WLAN (Wireless Local Area Network) authentication component 5.

The ME 100 further comprises a mass storage unit 8, and a network connection block 6 configured to permit connection between the ME 100 and a telecommunication network.

A Subscriber Identification Module (SIM) or a Universal Subscriber Identification Module (USIM), called (U)SIM 7, is placed in the ME 100.

The security manager 1 can be implemented as hardware or software or as a combination thereof. The security manager 1 comprises a service logic module 10 for controlling the security manager 1, and a passive challenge collection module 11 configured to monitor a plurality of authentication procedures and to collect the challenge generated by a network entity and the response consequently provided by the U(SIM) 7.

The security manager 1 further comprises a combined (U)SIM/network anti-spoofing logic 12 configured to prevent attacks consisting in an attacker attempting to gain unauthorized access to local resources.

The security manager 1 further comprises an offline authentication module 13 configured to perform offline authentication, and an active challenge generation and collection block 14 configured to generate authentication challenges, to send them to the (U)SIM 7 and to collect related response.

The security manager 1 further comprises a data confidentiality and integrity block 15 configured to encrypt/decrypt files and ensuring their integrity.

The security manager 1 is configured to have access to a network connection, via the network connection block 6, and to be capable of communicating with the (U)SIM 7 through the exchange of Application Protocol Data Units (APDU).

In addition, the security manager 1 may be configured to be capable of reading and writing on the mass storage peripheral 8 and to be capable of monitoring the execution of a plurality of authentication procedures involving the (U)SIM 7 and to retrieve information from them.

The security manager 1 comprises persistent storage capabilities, such as access to a relational database 16, and the keying material 17 to validate the authenticity of a remote network entity, such as the public key of a X.509 certificate.

The security manager 1 enables the ME 100 to use (U)SIM-generated security information to decide whether to grant a user access to local resources present on the ME 100, such as data and applications. The security manager 1 is capable of securely validating the authenticity of the (U)SIM 7 either with or without support of a remote network entity. Therefore, (U)SIM authentication can be executed even in offline contexts, where network connectivity is unavailable. The security manager 1 is also capable of identifying and preventing attacks consisting in an attacker attempting to gain unauthorized access to local resources of the ME 100 through the combined use of a spoofed (U)SIM and a spoofed mobile network.

The security manager 1 can provide these features by executing the following procedures.

Firstly, when network connectivity is available, the security manager 1 either actively executes authentication procedures involving a network entity or monitors appropriate authentication procedures executed by other components located on the ME 100. At this stage, the security manager 1 may execute a plurality of mechanisms to prevent attacks involving combined (U)SIM 7 and network 6 spoofing. If said authentication procedure is successful, the security manager 1 grants access to the local resources of the ME 100 and collects a set of information exchanged during the authentication procedure such as network challenge and (U)SIM response.

This information is securely stored in the relational database 16 or in any appropriate persistent storage mean, in order to be subsequently reused to authenticate the (U)SIM 7 if relevant authentication network entities are not available.

Secondly, if no appropriate network authentication entities are available, the security manager 1 uses the information collected at the previous stage to verify the validity of the (U)SIM inserted in the device 100. If this procedure is successful, the security manager 1 grants access to the device local resources.

These two stages are described in large detail below.

The collection of authentication data to be used for authentication in offline contexts can be executed in two ways: passively or actively. Passive collection consists in the security manager 1 monitoring a plurality of authentication procedures and collecting the challenge generated by a network entity and the response consequently provided by the (U)SIM 7 and, in case the monitored procedure is successful, process and store them. Differently, active collection consists in the security manager 1 generating authentication challenges itself, sending them to the (U)SIM 7 and collecting related responses.

Passive collection can be achieved by monitoring any of the authentication procedures that involve the execution of either the GSM AKA (Authentication and Key Exchange) mechanism (sometimes referred to as 2G AKA) or the UMTS AKA mechanism (sometimes referred to as 3GPP AKA).

The GSM AKA mechanism allows a network authentication entity to authenticate the identity of a SIM. It is executed as part of a number of authentication procedures, such as GSM authentication, GPRS authentication, 2G GBA bootstrap and EAP-SIM.

Figure 2:
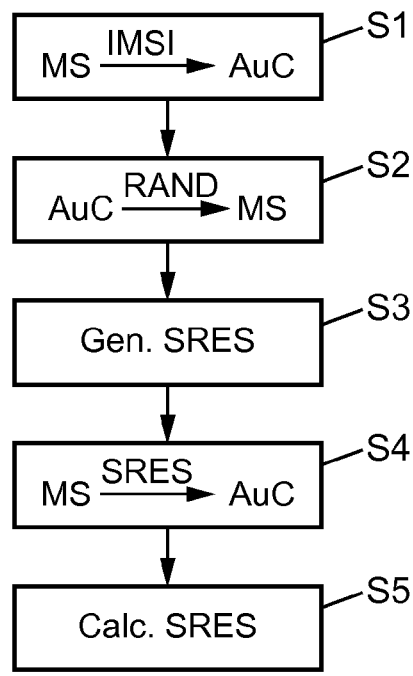
FIG. 2 is a flow chart showing steps of a method of Authentication and Key Exchange (AKA) in Global System for Mobile Communications (GSM)

Referring to FIG. 2, we are describing a GSM AKA mechanism.

In step S1, a Mobile Station (MS), comprising the ME 100 and the SIM 7, submits to a network Authentication Centre (AuC) its IMSI (International Mobile Subscriber Identity) number and requests to be authenticated.

In step S2, the AuC generates a 128 bit random number, called RAND and sends it to the MS.

In step S3, the SIM 7 uses the RAND received from the AuC and its secret key $K_I$ to generate a 32-bit response called SRES and a 64-bit ciphering key called $K_C$.

In step S4, the MS sends to the AuC the value of SRES calculated by the SIM 7.

In step S5, the AuC, which has a copy of the secret key KI of the SIM 7, calculate SRES and KC on its side. If the value of SRES calculated by the AuC matches with the one provided by the SIM 7, the SIM 7 authenticity is verified.

Differently from the GSM AKA, the UMTS AKA provide mutual authentication between the USIM and the network. This mechanism is used in a larger number of authentication procedures, including UMTS authentication, EAP (Extensible Authentication Protocol)-AKA, GBA (Generic Bootstrapping Architecture) bootstrap, IMS registration and LTE (Long Term Evolution) authentication.

Figure 3:
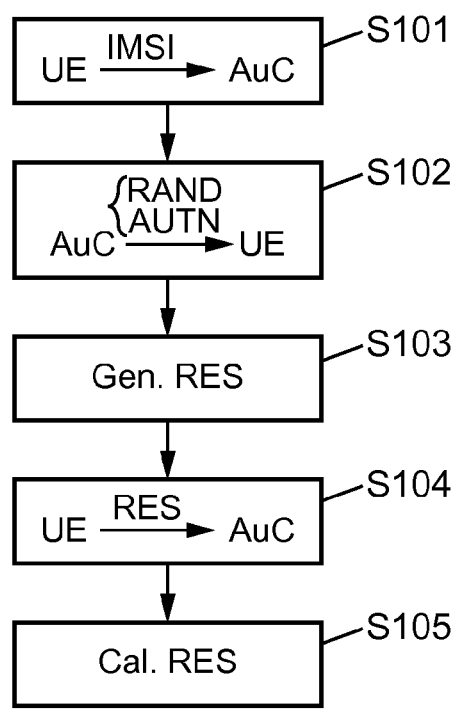
FIG. 3 is a flow chart showing steps of a method of AKA in Universal Mobile Telecommunications System (UMTS)

Referring to FIG. 3, we are describing a UMTS AKA mechanism.

In step S101, a User Equipment (UE), comprising the ME 100 and the USIM 7, submits to the network Authentication Centre (AuC) its IMSI number and requests to be authenticated.

In step S102, the AuC generates a random number called RAND, as in the case of the GSM AKA, together with an Authentication Token (AUTN). The AUTN is generated with keying material present on the AuC and is used by the USIM 7 to validate the authenticity of the network. The AuC then sends RAND and AUTN to the authenticating UE.

In step S103, the USIM 7, upon reception of RAND and AUTN, first of all, checks the authenticity of the AUTN. If the AUTN is authentic, the USIM 7 generates a response sequence RES long up to 128 bits, a 128-bit cipher key called CK and a 128-bit integrity key called IK. These values, similarly to the case of the GSM AKA are generated based on the value of the RAND and of the USIM 7 secret key K. If the AUTN is not authentic, the USIM 7 does not calculate RES, CK and IK and the AKA fails.

In step 104, if the AUTN verification is successful, the UE sends to the AuC the value of RES obtained from the RAND previously received.

In step 105, the AuC, which has a copy of the key K of USIM 7, calculates RES, CK and IK on its side. If the value of RES calculated by the AuC matches with the one provided by the USIM 7, the USIM authenticity is verified.

It should be noticed that the 3GPP defines a set of conversion functions that allow to derive GMS-AKA's SRES from UMTS-AKA's RES and GSM-AKA's KC from UMTS-AKA's CK and IK. These conversion functions, called respectively c2 and c3, are described in 3GPP TS 33.102 release 9, section 6.8.1.2. These conversion functions are used by embodiments of this invention in order to compare results obtained with UMTS AKA and GSM AKA mechanisms. Reference to the utilisation of conversion functions c2 and c3 is provided in FIG. 4 and FIG. 5.

Figure 4:
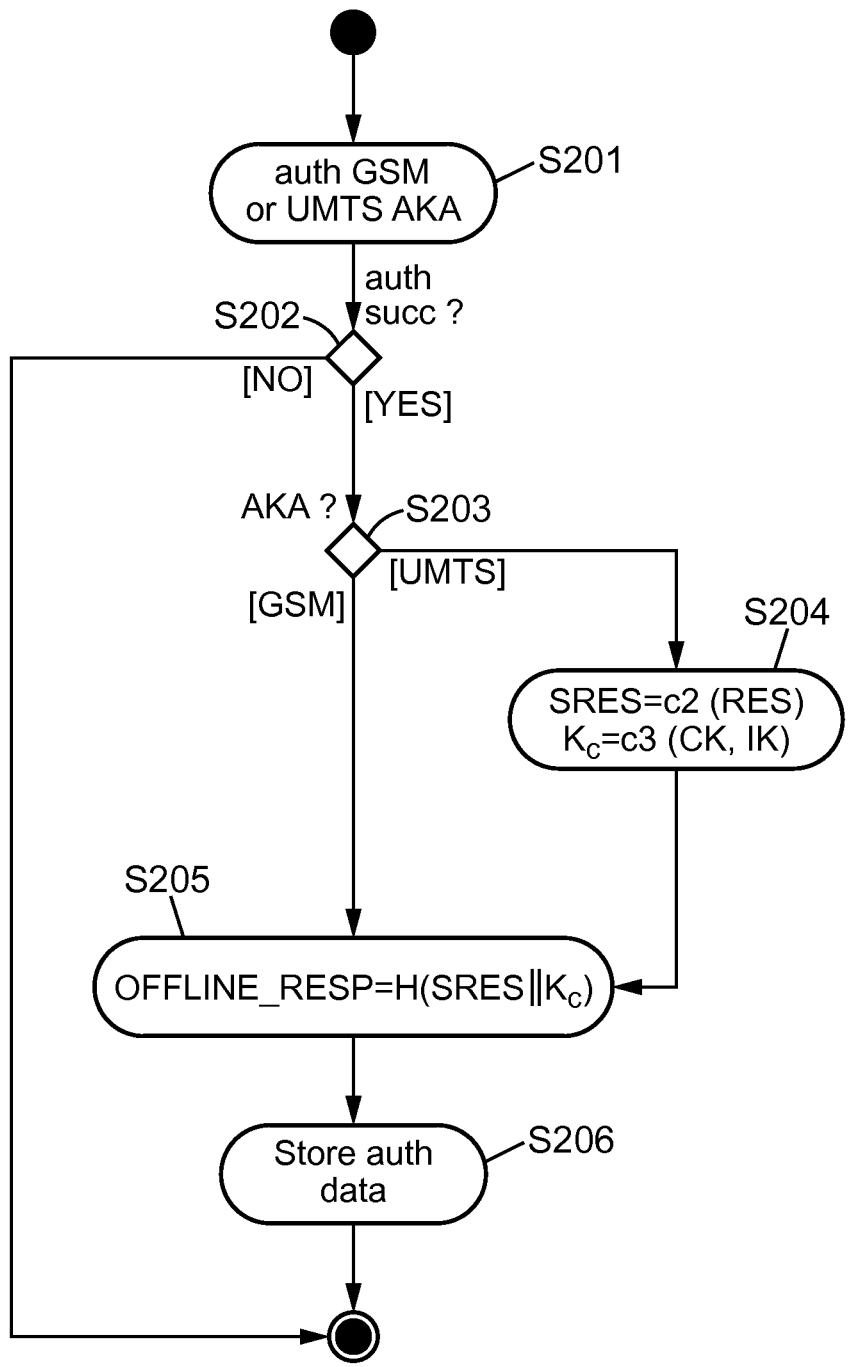
FIG. 4 is a flow chart showing steps of a method for passive collection of authentication data.

FIG. 4 shows a method for passive collection of authentication data.

In step S201, the security manager 1 starts monitoring an authentication procedure.

In step S202, the security manager 1 tests a condition of success of the authentication procedure. If the authentication procedure is successful, the method goes to step S203, if not the procedure exits.

In step S203, the security manager 1 determines a type of AKA.

If the procedure being monitored involves the execution of the UMTS-AKA mechanism, the method goes to step S204. Differently, if the monitored procedure involves the execution of the GSM-AKA mechanism, the security manager 1 collects SRES and $K_C$ directly and the method goes to step S205.

In step S204, the security manager 1 collects the value of RAND, RES, CK and IK. Then, the security manager 1 calculates SRES from RES through the conversion function c2 and $K_C$ from CK and IK through the conversion function c3.

Figure 5:
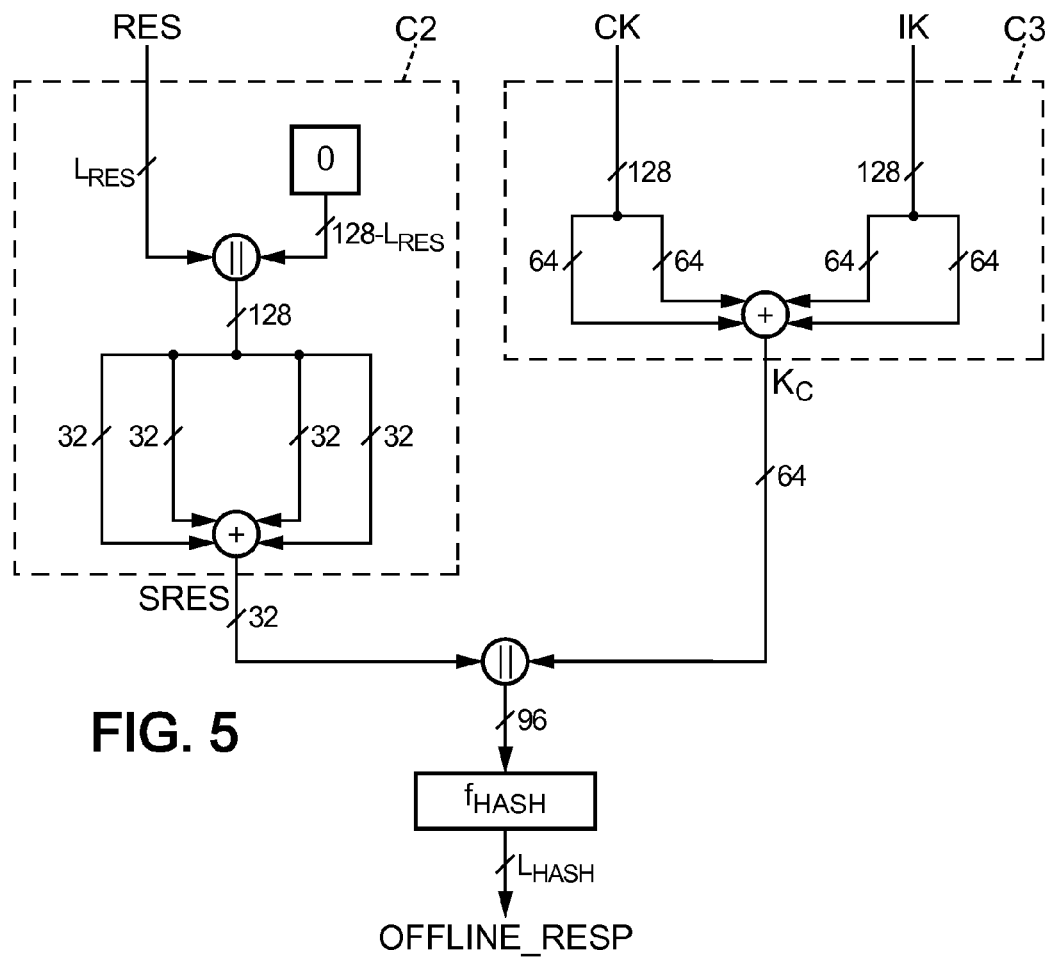
FIG. 5 is a schematic block diagram of a system for creating a hash code of a concatenated sequence obtained from a 32-bit response (SRES) and a 64-bit ciphering key ($K_C$)

In step S205, from the values of SRES and $K_C$ obtained, the security manager 1 generates an offline authentication expected response, hereby defined OFFLINE_RESP, obtained by concatenating SRES and $K_C$ and, subsequently, creating a hash code of the concatenated sequence obtained from SRES and $K_C$, as shown in FIG. 5:

$$\text{OFFLINE\_RESP} = H(\text{SRES} \| K_C)$$

In step S206, the security manager 1 stores authentication data in the database 16.

The rationale for generating OFFLINE_RESP as explained here is that, requiring both SRES and $K_C$ for this operation prevents attackers from obtaining OFFLINE_RESP by sniffing the AKA procedure over an unencrypted communication channel. In fact, $K_C$ is not exchanged over the air interface during the AKA and is available only to the ME 100 and, in certain procedures, is passed by the AuC to the BSS/RNS (Base Station Subsystem/Radio Network Subsystem). In addition, the hashing of the data makes it impossible to obtain SRES and $K_C$ from OFFLINE_RESP in case access to the security manager database 16 was illicitly gained.

Differently from passive collection, the active collection consists in the security manager 1 generating autonomously the random sequence RAND and sending it to the (U)SIM 7 in order to obtain authentication data. In this case, UMTS AKA could not be used to calculate the response to the given RAND. In fact, since the security manager 1 does not have knowledge of the USIM security key K and the sequence number SQN, it would not be able to generate a valid AUTN. As a result, all attempts to obtain RES, CK and IK would be rejected by the USIM 7. For this reason, the GSM AKA mechanism is used and $K_C$ and SRES are collected as a response.

Figure 6:
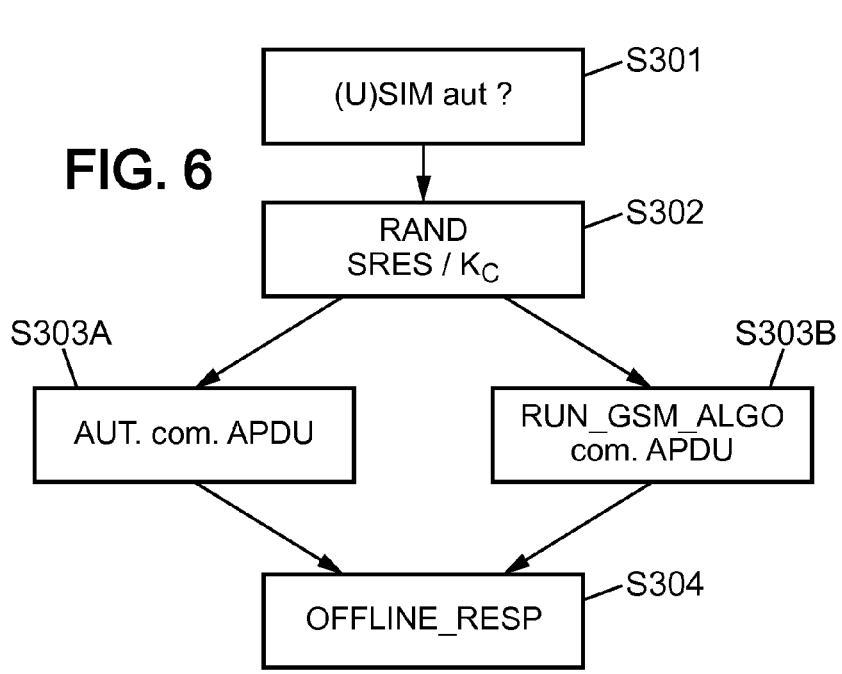
FIG. 6 is a flow chart showing steps of a method for active collection of authentication data.

FIG. 6 shows a method for active collection of authentication data.

In step S301, the security manager 1 verifies that the (U)SIM 7 has previously been authenticated by the network through any authentication protocol based on UMTS or GSM AKA, and therefore a security context is currently established. This verification ensures that the (U)SIM 7 is authentic.

In step S302, the security manager 1 sends to the (U)SIM 7 one or more random strings RAND and collects as many SRES/$K_C$ duplets. The active collection of $K_C$ and SRES can be carried out in two different ways, depending on the capabilities of the ME 100 and of the (U)SIM 7.

If the security manager 1 is on a UMTS-enabled ME 100 and the card containing the (U)SIM 7 is a UICC with a USIM application supporting operation in a GSM security context, the security manager 1 sends, in step S303A, an AUTHENTICATE command APDU (Application Protocol Data Unit) to the card, appending the locally generated RAND and specifying as authentication context the value "GSM context", as explained by 3GPP TS 31.102.

If the security manager 1 is on a GSM-only ME 100 or the card containing the (U)SIM 7 is a SIM card without UICC, the security manager 1 sends, in step S303B, a RUN_GSM_ALGO command APDU to the card, appending the generated RAND to the message.

In step S304, the security manager 1 obtains $K_C$ and SRES as response to the AUTHENTICATE or RUN_GSM_ALGO APDU messages sent and generates the expected offline response OFFLINE_RESP, as for the case of passive authentication data collection, described above.

After the security manager 1 has successfully collected the desired authentication data, either passively or actively, it stores them in the relational database 16, in order to reuse them when needed. Each record of the database 16 may contain the following fields:

- the IMSI of the (U)SIM 7 to which the authentication data refers,
- the ICCID (Integrated Circuit Card ID) of the card on which the (U)SIM 7 is installed. As explained more in detail later, the combined knowledge of IMSI and ICCID enables to appropriately perform offline the authentication in case a UICC (Universal Integrated Circuit Card) card has multiple USIM applications. Nevertheless, it would also be possible to store the ICCID and IMSI matching information in a separate table.
- the RAND used to generate the authentication data,
- the OFFLINE_RESP calculated from SRES and $K_C$,
- a flag indicating whether the validity of the authentication data is verified against combined (U)SIM and network spoofing attacks,
- a flag indicating whether the authentication data has been collected actively or passively,
- the number of times this RAND has been replayed in offline contexts. This value is initially set to 0 and later updated by the security manager 1 each time the RAND/OFFLINE_RESP duplet is used.
- the timestamp related to the time when the RAND/OFFLINE_RESP duplet has been collected.

The challenge/response collection mechanism described above could be vulnerable to attacks where both a spoofed (U)SIM and a spoofed network are used in conjunction to simulate a successful AKA authentication. In fact, in this scenario, an attacker could insert into the ME 100 a (U)SIM with a spoofed IMSI and run an authentication based on either UMTS or GSM AKA with a spoofed network resulting in the spoofed network and spoofed (U)SIM pretending to successfully authenticate each other without knowing the real secret key of the authentic (U)SIM. As a result, whether active or passive collection is being performed, the security manager 1 will collect forged authentication data injected by the attacker believing them to be genuine. As a consequence, the data inserted in the database are poisoned and the security of the system is compromised.

If attacks based on combined (U)SIM and network spoofing are deemed likely to occur and are required to be prevented, two solutions can be optionally adopted to effectively address this issue.

Figure 7A:
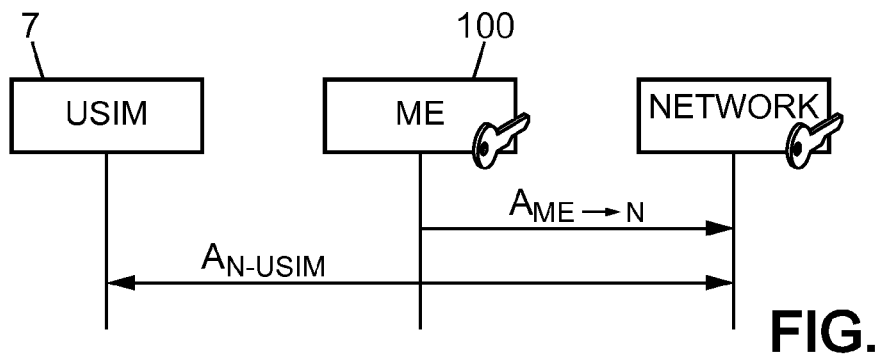
FIG. 7a and FIG. 7b are charts which show examples of authentication enabling to prevent attacks based on combined (U)SIM and network spoofing, according to a first embodiment of the invention.
Figure 7B:
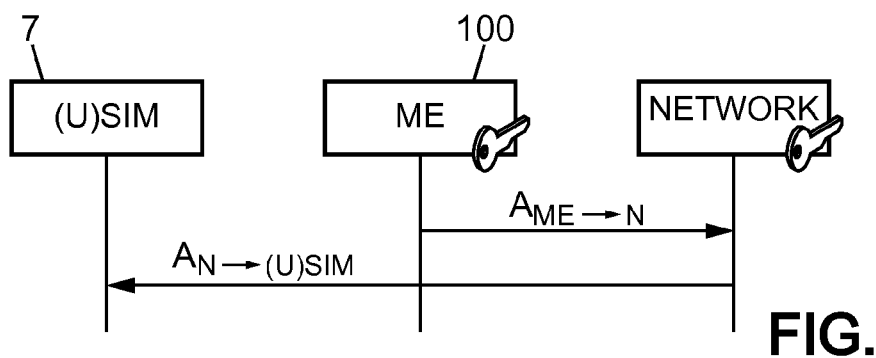

The first solution, represented in FIG. 7A and in FIG. 7B, consists in the ME 100 authenticating the network entity running the AKA, i.e. the network server which issues the RAND (and the AUTN, in UMTS AKA case) and validates (U)SIM's (S)RES. This authentication can be executed, for instance, with the verification of a X.509 certificate assigned to the network entity involved in the AKA, where the ME 100 knows the public key of said certificate and can verify its validity. As an example, this procedure could be carried out as part of a GBA bootstrap. In fact, in this case, the component of the ME 100 running the bootstrap procedure could set up a TLS (Transport Layer Security) connection with the GBA BSF (Bootstrapping Server Function) and verify its certificate before executing the bootstrap. If the verification of the server identity by the ME 100 is successful and the subsequent AKA (either GSM or UMTS) is also successful, the ME 100 can assume that both network and (U)SIM 7 are genuine. Indeed, with this procedure, whether GSM or UMTS AKA is used, the ME 100 authenticates the network, as symbolized by arrow $A_{ME \to N}$, and the network authenticates the (U)SIM 7. Network and USIM 7 mutually authenticate with UMTS AKA, as symbolized by arrow $A_{N\text{-}USIM}$ in FIG. 7A, and network authenticates (U)SIM 7 with GSM AKA, as symbolized by arrow $A_{N \to (U)SIM}$ in FIG. 7B. Therefore, transitively, the ME 100 can reliably validate the authenticity of the (U)SIM 7.

Figure 8A:
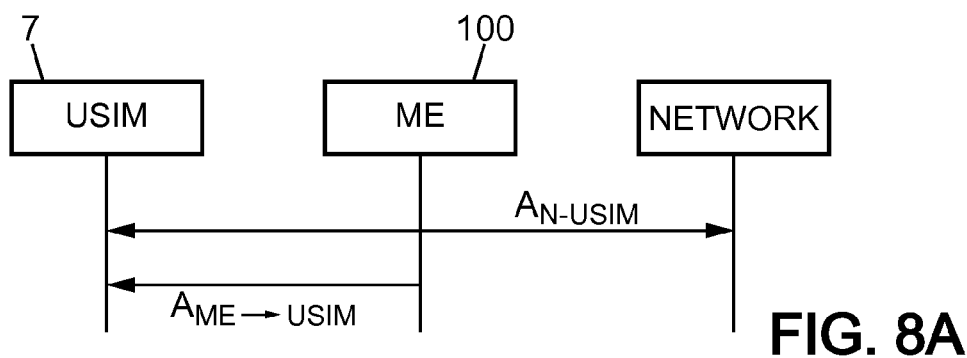
FIG. 8a and FIG. 8b are charts which show examples of authentication enabling to prevent attacks based on combined (U)SIM and network spoofing, according to a second embodiment of the invention.
Figure 8B:
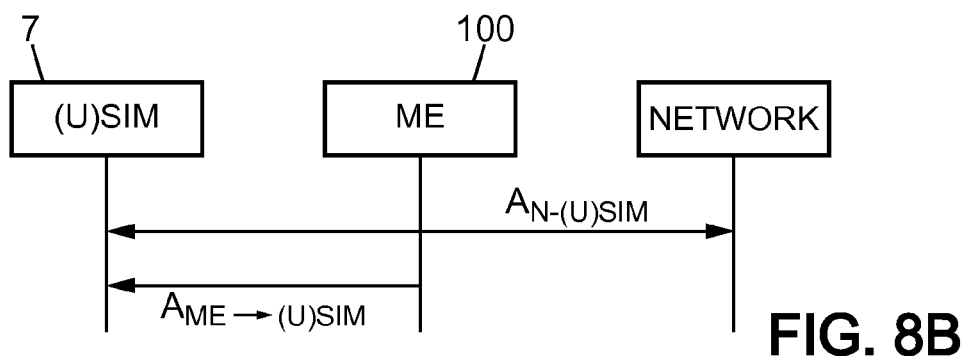

Alternatively to this first solution, a second solution can be adopted to prevent combined (U)SIM and network spoofing in case the ME 100, for any reason, cannot verify the authenticity of the network entity running the AKA, as described above. This solution, depicted in FIGS. 8A and FIG. 8B, comprises two steps. First, the (U)SIM 7 and the network run an authentication procedure based on either a GSM or UMTS AKA. Network and USIM 7 mutually authenticate with UMTS AKA, as symbolized by arrow $A_{N\text{-}USIM}$ in FIG. 8A, and network authenticates (U)SIM 7 with GSM AKA, as symbolized by arrow $A_{N \to (U)SIM}$ in FIG. 8B. Second, if the authentication is successful and the security manager 1 has in its database 16 at least one record containing a RAND/OFFLINE_RESP duplet that can be considered reliable (i.e. not poisoned by combined USIM/network spoofing attacks), the security manager 1 actively sends a challenge to the (U)SIM 7 and compares the response with the value of OFFLINE_RESP present in the database 16, as symbolized by arrow $A_{ME \to USIM}$ in FIG. 8A and by arrow $A_{ME \to (U)SIM}$ in FIG. 8B. If the values match, then the security manager 1 can reliably assume that both (U)SIM and network are authentic. The methods to be used for selecting a RAND/OFFLINE_RESP duplet to play, sending it to the (U)SIM 7 and comparing the results obtained with those expected are described later.

If any or both of the two solutions described above have been executed together with either a successful GSM or UMTS AKA, the (U)SIM 7 can be assumed to be authentic. Therefore, the collection of authentication data obtained by passively monitoring this mechanism is protected against combined (U)SIM and network spoofing attacks. In addition, after a security context is established with one or both of these two solutions being executed, the security manager 1 can actively collect authentication data from the (U)SIM 7 with protection from combined (U)SIM and network spoofing attacks. When the security manager 1 stores authentication data collected with these methods, either actively or passively, it must set the flag indicating that the RAND/OFFLINE_RESP collected is protected against combined (U)SIM and network spoofing.

We are describing below a process through which it is possible to implement access control to local resources of the ME 100, based on the verification of the identity of a (U)SIM 7. With the term "resource", it is intended any physical or logical entity present on the ME 100 that a user can consume or from which can obtain benefits. Examples of such resources include, but are not limited to, software components, such as files, directories, applications, operating systems, virtual machine images and hardware components, such as storage devices and input or output peripherals, such as cameras, microphones, sensors and network interfaces.

First of all, in order to perform the authentication process enforcing access control, all resources of the ME 100 that are intended to be covered by this protection must be labelled with the IMSI(s) of the (U)SIM(s) whose owner(s) are authorized to access that resource. Optionally, resources could also be labelled with the list of operations that authorised IMSIs can perform on them. Alternatively, those resources can also be labelled with an alternative identifier that could be uniquely mapped to an IMSI. If all local resources on the ME 100 are supposed to have the same access conditions, the list of authorised IMSIs can be centralised. Possible methods for representing the list of authorised IMSIs to access resources and the action their owners are allowed to perform on them are known to those skilled in the art and are beyond the scope of this invention.

Figure 9:
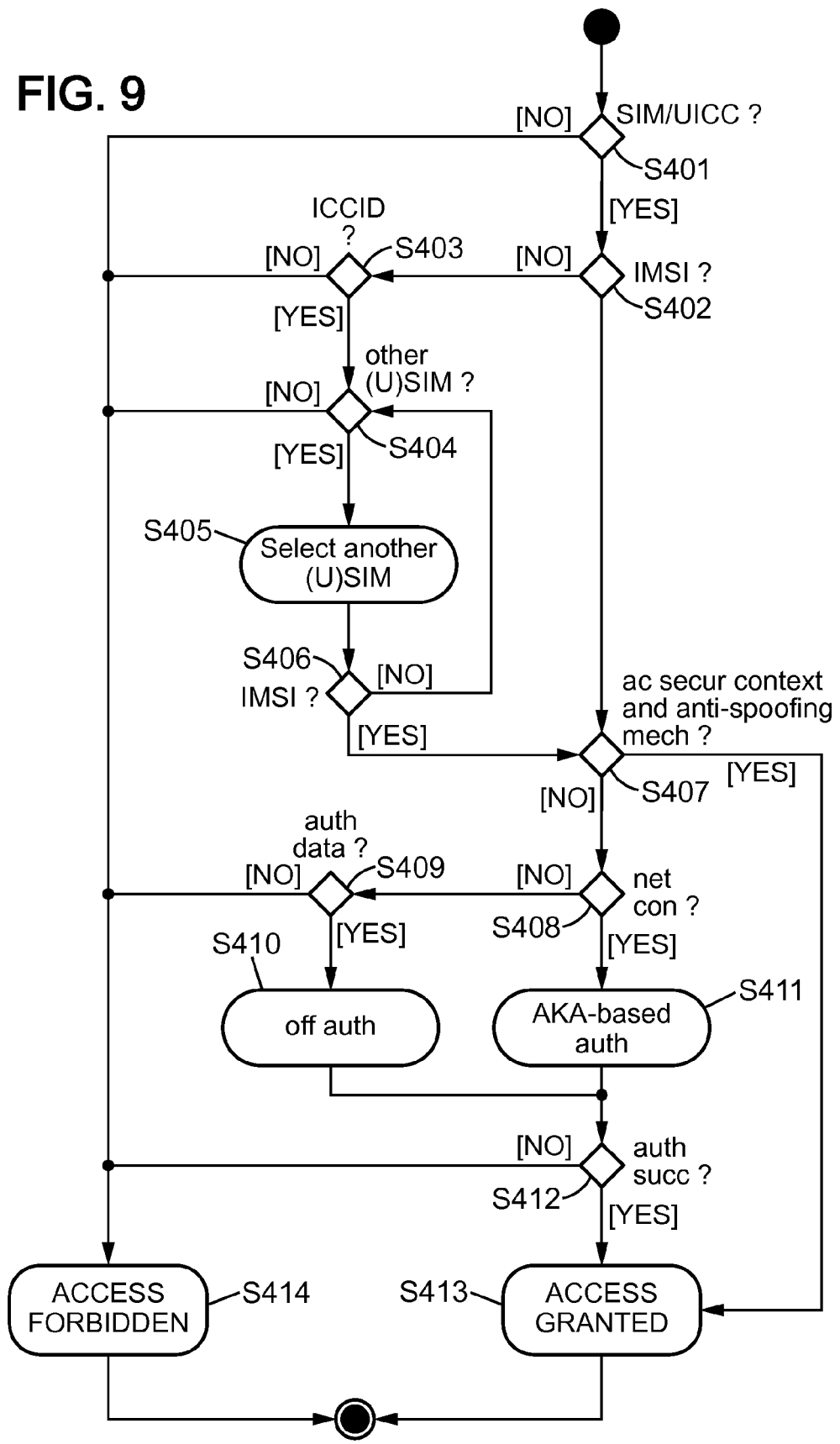
FIG. 9 is a flow chart showing steps of a method of authentication.

FIG. 9 represents a complete authentication procedure. The security manager 1 initiates the authentication procedure when access to a specific resource protected by access control is requested by a user. Alternatively, it can initiate the procedure at boot time or at any other relevant event.

In step S401, the security manager 1 verifies if a SIM or UICC card is inserted into the ME 100. If no card is available, access to the resources is denied (step S414) and the procedure exits. Otherwise, if a card is inserted, the method goes to step S402.

In step S402, the security manager 1 checks the IMSI of the currently selected (U)SIM application. If it does not match with the IMSI that needs to be authenticated, the method goes to step S403. If it matches the method goes to step S407.

In step S403, the security manager 1 reads the value of the ICCID of the card. If this ICCID does not match with the value of the ICCID of the card on which the requested (U)SIM application is supposed to be installed, it means that a different card is inserted. In this case, access to the resources is denied (step S414) and the procedure exits.

Differently, if this ICCID matches with the value of the ICCID of the card on which the requested (U)SIM application is supposed to be installed, it may mean that the card has multiple (U)SIM applications and the required one is not currently selected. In this case, the method goes to step S404.

In step S404, the security manager 1 tests a condition of other (U)SIM applications not yet selected. In case there is no other (U)SIM, access to the resources is denied (step S414) and the procedure exits. In case there is other (U)SIM, the method goes to step S405.

In steps S405 and S406, the security manager 1 selects one-by-one all the (U)SIM applications present on the card until it finds the one with the required IMSI. The way to know if a card is equipped with multiple (U)SIM applications and how to select them is well knows to those skilled in the art and it is beyond the scope of this invention. If the desired (U)SIM application is not found, access to the resources is denied (step S414) and the procedure exits.

It should be noticed that in these steps it is assumed that the security manager 1 has knowledge of the expected ICCID-IMSI mapping. This information can be gathered from the database table containing the list of RAND/OFFLINE_RESP duplets for offline authentication or from a separate table, as described above.

Once the (U)SIM with the required IMSI is selected, in step S407, the security manager 1 tests if there is an active security context and if anti-spoofing mechanisms have been successfully executed. If there is an active security context established between the (U)SIM with the required IMSI and the network and if anti-spoofing mechanisms have been successfully executed, the method goes to step S413. If not the method goes to step S408.

In step S408, the security manager 1 tests if network connectivity is available. If network connectivity is available the method goes to step S411. If not the method goes to step S409.

In step S409, the security manager 1 tests if there is authentication data available for running offline authentication. If there is authentication data available for running offline authentication the method goes to step S410. If not the access to local resources is forbidden (step S414).

In step S410, if no network connectivity is available or if no network entities for performing an AKA are reachable, the security manager 1 performs an offline authentication, as detailed later. If this offline authentication is successful (step S412), access to the resources is granted (step S413), otherwise is denied (step S414). After this stage, the authentication process exits.

In step S411, the security manager 1 runs any suitable (U)SIM authentication procedure involving either UMTS or GSM AKA. In addition, the security manager 1 can execute one of the procedures to prevent combined USIM/network spoofing attacks described above.

In step S412, the security manager 1 tests if the authentication is successful. If the authentication is successful, access to the resources is granted (step S413) and the procedure exits. If the authentication is not successful, access to the resources is denied (step S414) and the procedure exits.

Alternatively to the authentication procedure described above, where the IMSI to be authenticated is explicitly specified in the process and it corresponds to the owner of the specific resource to which access is required, the authentication procedure could also be carried out on an implicit IMSI. As a matter of fact, the authentication procedure could be executed by the security manager on the IMSI of the (U)SIM application selected at the moment the procedure is initiated.

Figure 10:
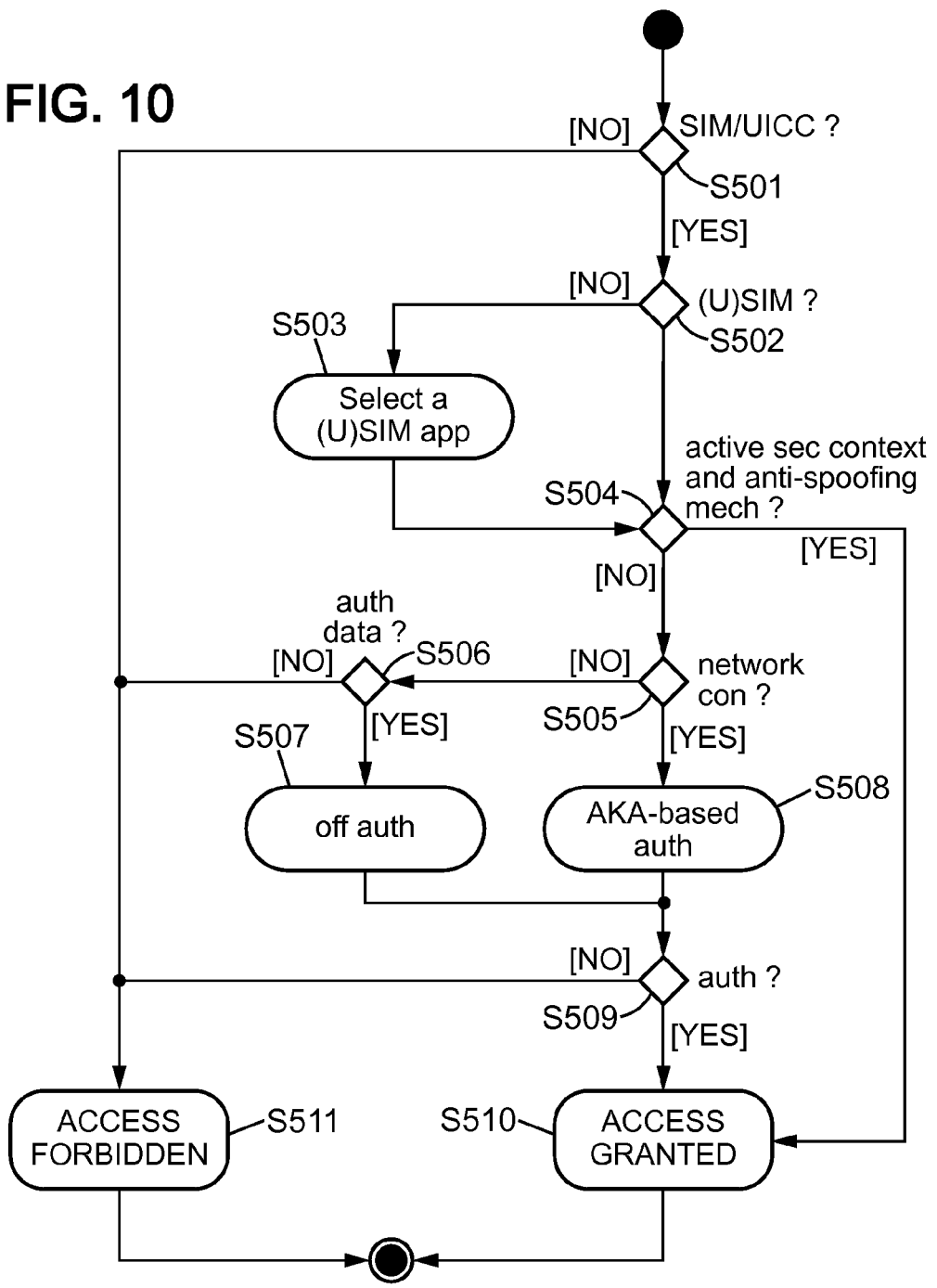
FIG. 10 is a flow chart showing steps of a method of authentication with an implicit International Mobile Subscriber Identity (IMSI)

FIG. 10 shows an activity diagram of the authentication procedure with an implicit IMSI.

In step S501, the security manager 1 verifies if a SIM or UICC card is inserted into the ME 100. If no card is available, access to the resources is denied (step S511) and the procedure exits. Otherwise, if a card is inserted, the method goes to step S502.

In step S502, the security manager 1 tests if a (U)SIM is currently selected. If a (U)SIM is currently selected, the method goes to step S504. If not the method goes to step S503.

In step S503, the security manager 1 selects a (U)SIM application.

In step S504, the security manager 1 tests if there is an active security context and if anti-spoofing mechanisms have been successfully executed. If there is an active security context and if anti-spoofing mechanisms have been successfully executed the method goes to step S510. If not the method goes to step S505.

In step S505, the security manager 1 tests if there is network connectivity. If there is network connectivity the method goes to step S508. If not the method goes to step S506.

In step S506, the security manager 1 tests if there is authentication data available for running offline authentication. If there is authentication data available for running offline authentication the method goes to step S507. If not the access to local resources is forbidden (step S511).

In step S507, if no network connectivity is available or if no network entities for performing an AKA are reachable, the security manager 1 performs an offline authentication, as detailed later. If this offline authentication is successful (step S509), access to the resources is granted (step S510), otherwise is denied (step S511).

In step S508, the security manager 1 run AKA-based authentication with anti-spoofing mechanisms.

In step S509, the security manager 1 tests if the authentication is successful. If the authentication is successful, access to the resources is granted (step S510) and the procedure exits. If the authentication is not successful, access to the resources is denied (step S511) and the procedure exits.

Figure 11:
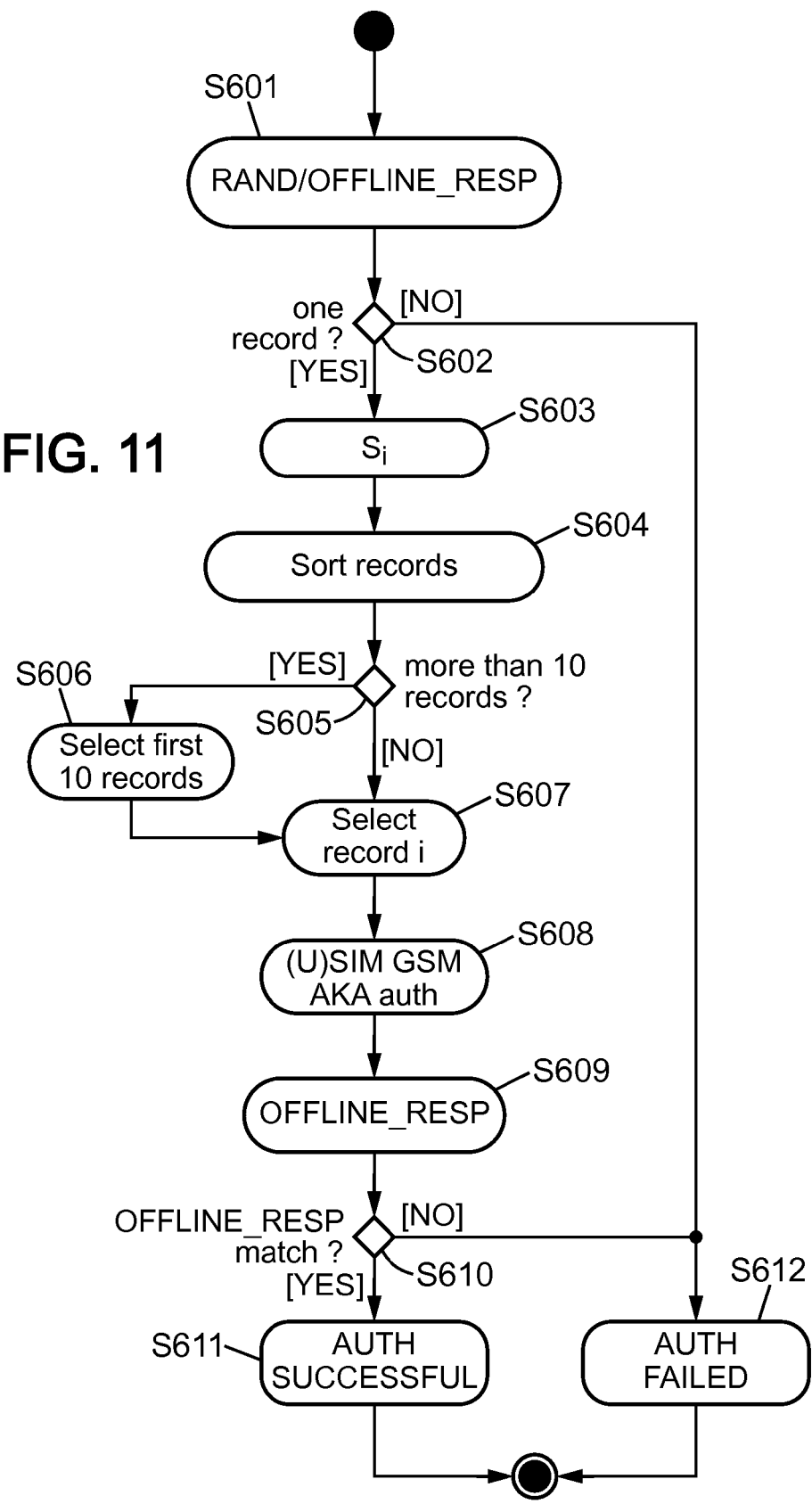
FIG. 11 is a flow chart showing steps of a method for offline authentication.

FIG. 11 represents an activity diagram of offline authentication process. Offline authentication consists in the replay to the (U)SIM 7 of a RAND sequence and the verification of (U)SIM's response against the value of the expected offline response OFFLINE_RESP stored in a record of the security manager's database 16. This mechanism consists of three aspects:
- selection of the RAND/OFFLINE_RESP duplet to replay, if more than one are available to the security manager 1,
- submission of the RAND to the (U)SIM 7 and collection of related response, and
- verification of the results against the value of OFFLINE_RESP.

With respect to the selection of the RAND/OFFLINE_RESP to select for the authentication, this invention defines an algorithm that maximises system security in case multiple records are present in the database 16 of the security manager 1. More specifically, this algorithm behaves differently depending on the fact that protection against combined (U)SIM/network spoofing is required or not.

In case this protection is required, the algorithm behaves as follows.

In step S601, the security manager 1 selects all the records where the value of the IMSI field matches with the IMSI of the (U)SIM 7 that has to be offline-authenticated.

Then, the security manager 1 selects all the records that have been collected using one of the two methods preventing combined (U)SIM/network spoofing. This can be achieved by selecting only the records with relevant flag set.

In step S602, the security manager 1 tests if there is at least one record selected. If there is at least one record selected the method goes to step S603. If there are no records left, the offline authentication fails (step S612).

In step S603, if there is only one record, this sample is marked for being used. Otherwise, if multiple records are available, the record to be used for authentication is selected as follows. Each of the selected records in the database 16 is assigned a security index $S_i$, calculated as:

$$S_i = 2^{-r_i - a_i}$$

Where $r_i$ indicates the number of times this record has already been replayed and $a_i$ is equal to 1 if the sample has been collected actively or equal to 0 if collected passively.

In step S604, all the selected records of the list are sorted in descending order of $S_i$. If multiple elements have the same value of $S_i$, then they are sub-sorted from the most recent to the least recent timestamp of collection.

In step S605, the security manager 1 tests if the list has more than ten records. In this case, only the first ten records of the ordered list are selected (step S606), otherwise all the records in the list are selected.

In step S607, the record marked for being used will be the record at index i of the list, where i is a natural number between 1 and N, where N is the number of records of the list and i is the a realization of a random variable with probability density function equal to:

$$p(i) = \frac{S_i}{\sum_{k=1}^{N} S_k}$$

$$i \in N$$

$$1 \le i \le N \le 10$$

where i=1 corresponds to the first element of the list and i=N corresponds to the last element of the list and $S_i$ is the security index of the element at index i.

Differently, in case strict protection against combined (U)SIM/network spoofing is not required, the same algorithm described above can be executed, but with the two following differences:
records with combined (U)SIM/network spoofing protection flag unset are also selected, and
the value of the security index $S_i$ is calculated as follows:

$$s_i = 2^{v_i - r_i - a_i}$$

where $v_i$ is equal to 3 if the anti-spoofing flag is set or 0 if unset.

The probability distribution used for selecting the RAND/OFFLINE_RESP disclosed above is reported as example. Different selection methods could be equally used.

In step S608, once the RAND/OFFLINE_RESP duplet to be used for offline authentication has been selected, the security manager 1 sends to the (U)SIM 7 the random sequences RAND and collects the response. This procedure can be carried out in two different ways, depending on the capabilities of the ME 100 and of the (U)SIM 7.

According to a first way, if the security manager 1 is on a UMTS-enabled ME 100 and the card is a UICC with a USIM application supporting operation in a GSM security context, the security manager 1 sends an AUTHENTICATE command APDU to the card, appending the RAND and specifying as authentication context the value "GSM context", as explained by 3GPP TS 31.102 release 9.

According to a second way, if the security manager 1 is on a GSM-only ME 100 or the card is a SIM card without UICC (Universal Integrated Circuit Card), the security manager 1 sends a RUN_GSM_ALGO command APDU to the card appending the RAND to the message.

The security manager 1 obtains $K_C$ and SRES as response to the AUTHENTICATE or RUN_GSM_ALGO APDU commands sent during the step described above.

In step S609, the security manager 1 generates the expected offline response OFFLINE_RESP as:

OFFLINE_RESP=$H$(SRES$\|K_C$)

In step S610, the security manager 1 tests if the OFFLINE_RESP matches with the expected value.

If the value of OFFLINE_RESP calculated here matches with the value of OFFLINE_RESP present in the selected record of the database 16, the authentication is successful (step S611), otherwise it fails (step S612).

After the offline authentication has been executed, the security manager 1 increases by one the replays counter of the record that has been replayed. In addition, it is also recommendable that, if there are records that have already been replayed at least three times, they are deleted from the database 16.

Embodiments of the invention hereby described provide capabilities for controlling access to local resources of a mobile device 100 based on the verification of the authenticity of a (U)SIM 7. However, the effective applicability of these features relies on the fact that the mobile device hardware or software are capable of securely enforcing denial of access to those resources in the case (U)SIM authenticity is not verified. This could represent a strong limitation in case this mechanism is applied to control the access to data located on a removable memory storage mean, such as a Secure Digital (SD) card. In fact, the mobile device 100 can limit access to such removable memory equipment with the mechanism described above only as long as it inserted in the device 100. As a result, once it is removed from the device 100, the data stored on it could be read or written without control by another device not implementing access control features. Therefore, it is necessary to provide an adequate level of security to those data with appropriate means that can guarantee their confidentiality and integrity, in order that, even if the removable memory device is removed, data stored on it could not be interpretable and could not be modified without detection from a legitimate user.

More specifically, two methods can be applied to appropriately address this issue.

The first method consists in:
implementing confidentiality and integrity through mechanisms already known to those skilled in the art, such as using symmetric encryption algorithms to provide confidentiality and Message Authentication Codes (MAC) to provide integrity control, which could be applied on a file-by-file basis or to entire disk sectors.
store all the required keying material used for encryption/decryption and MAC generation/verification on a non-removable memory which is protected by the (U)SIM-based access control mechanism detailed above. In this way, the encryption/decryption and MAC generation/verification could be done only in presence of the (U)SIM 7 of a user authorised to access the data. In addition, the data cannot be understood or forged if the removable memory component is inserted in another device.

Also in this case, data must be labelled with the IMSIs of the (U)SIMs of the users allowed to access them, optionally complemented by an indication of what operation each user is permitted to execute.

A second method consists in using the (U)SIM security algorithms in the key generation process, in order to generate:
a cipher key $K_{CIPHER}$, to encrypt/decrypt data,
an integrity key $K_{INTEGRITY}$, to generate/verify Message Authentication Codes (MAC) for integrity purposes, and
an initialization vector IV to be used in combination with a block cipher to increase the robustness of encryption.

These values can then be used to encrypt/decrypt files and generate and verify message authentication codes (MAC), either on a file-by-file basis or on entire disk sectors.

Figure 12:
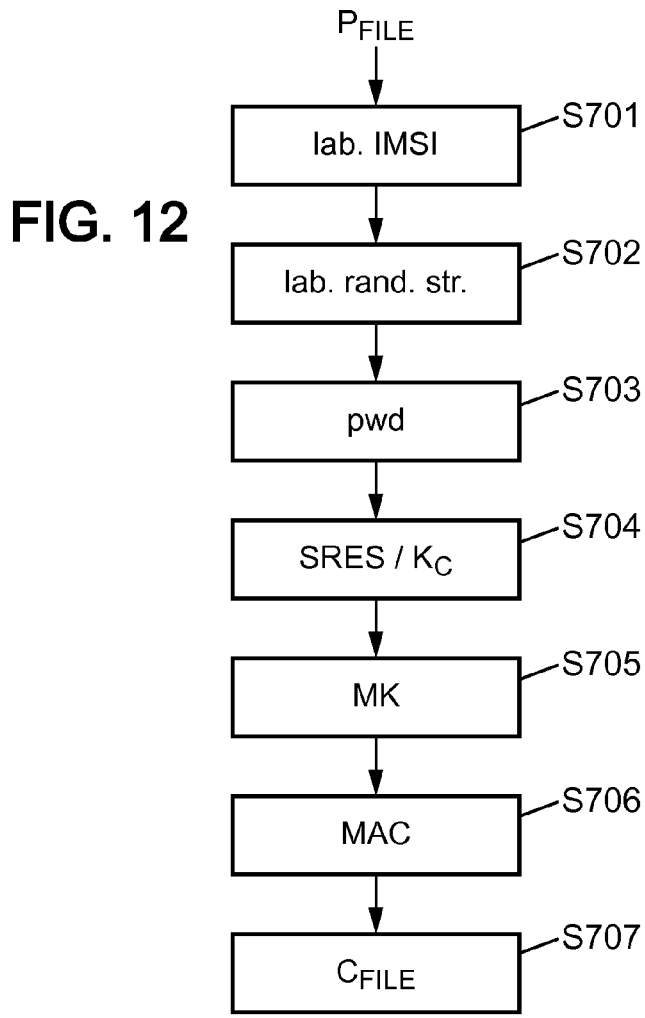
FIG. 12 and FIG. 13 are charts showing steps of a method for generating a Message Authentication Code (MAC) of file and/or for encrypting.
Figure 13:
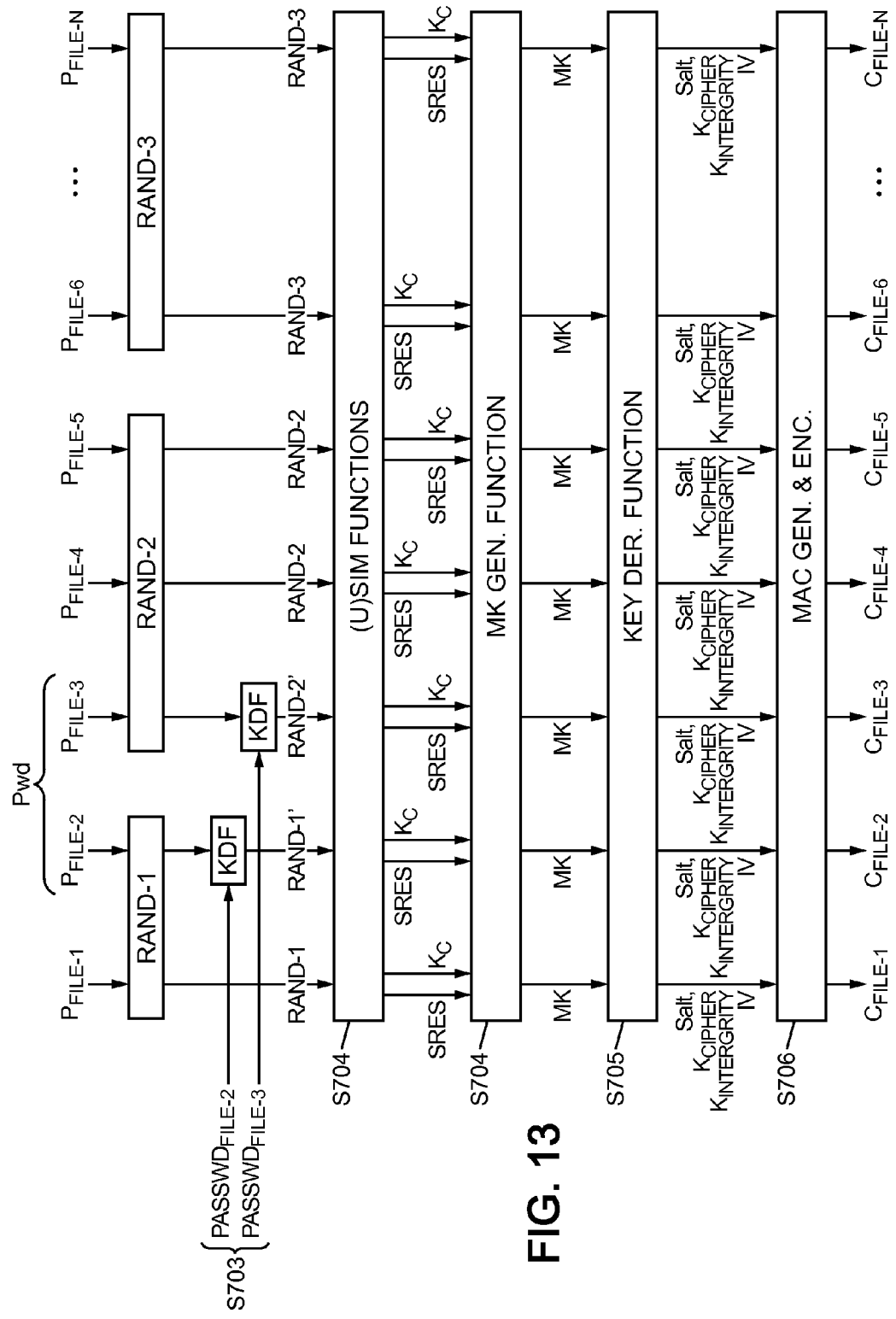

FIG. 12 and FIG. 13 illustrates the process for generating a MAC of file and/or for encrypting it.

In step S701, each file $P_{FILE}$ that requires to be encrypted needs to be labelled with the IMSI of the (U)SIM 7 required for its decryption or with a unique string that can be univocally mapped to that IMSI.

In step S702, the file is then labelled with a 128-bit random string that will be used as input for the AUTHENTICATE/

RUN_GSM_ALGO function of the (U)SIM 7. This random sequence can be a global non-secret attribute of the memory drive and used by all files of the drive. Alternatively, it can be selected from a pool of few 128-bit random strings present either on the memory drive itself or the mobile device memory or on a remote entity. In addition, files can be labelled directly with this random sequence or, alternatively, with an identifier that can be mapped with this random string. It is necessary to make sure that the total number of those random strings in the system is limited. In fact, as it will be explained later, they are sent as input to the (U)SIM 7 for the generation of keying material and, if a large plurality of files are protected with this mechanism and are all associated to different strings, their encryption/decryption would require many AUTHENTICATE/RUN_GSM_ALGO APDU commands to be sent to the (U)SIM 7. Since (U)SIM applications generally stop working after a moderately high number of authentication procedures received (generally $2^{16}$), such a scenario could severely reduce (U)SIM lifecycle.

In step S703, if it is desired to protect the file with a password, a password is provided by the user and it is used to generate a secondary 128 bit random string. In FIG. 13, files $P_{FILE-2}$ and $P_{FILE-3}$ are protected by a password. This secondary random string will be used for the rest of the algorithm. In one embodiment, this supplementary string can be generated from the MD5 hashing of the original random string concatenated with the password, as explained here:

$$RAND'=MD5(RAND\|PASSWORD)$$

In step S704, this random string is then appended to an AUTHENTICATE or RUN_GSM_ALGO APDU command and sent to the (U)SIM 7 in order to obtain SRES and $K_C$, similarly to the case of the offline authentication described above. SRES and $K_C$ are then fed to a function which generates a master key as function of only those two values. In one embodiment, this function could be the same function used to generate OFFLINE_RESP strings as described above, therefore:

$$MK=H(SRES\|K_C)$$

Figure 14:
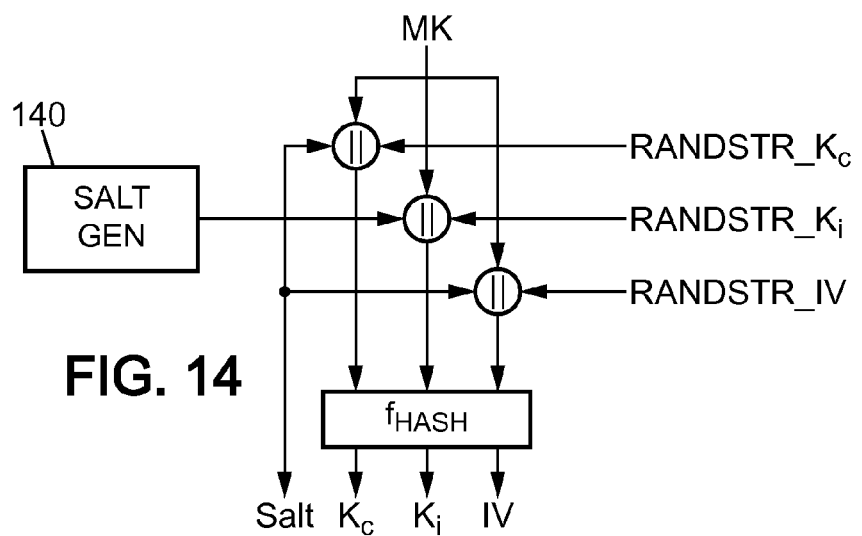
FIG. 14 is a schematic block diagram of a key derivation function.

In step S705, the master key is then fed into a key derivation function, depicted in FIG. 14 which:
  generates, with a salt generator 140, a "salt", i.e. a random string long at least 64-bits, which is unique and specific to the file that is to be encrypted,
  uses the salt and the master key to generate $K_{CIPHER}$, $K_{INTEGRITY}$ and IV as:

$$K_{CIPHER}=H(SALT\|MK\|RANDSTR\_K_C)$$

$$K_{INTEGRITY}=H(SALT\|MK\|RANDSTR\_K_I)$$

$$IV=H(SALT\|MK\|RANDSTR\_IV)$$

Where RANDSTR_KC, RANDSTR_KI and RANDSTR_IV are three well-known constant random strings, which are used to differentiate the three outputs above.

In step S706, $K_{INTEGRITY}$ can be used to generate a MAC of the file (e.g. with a Hash-based Message Authentication Code (HMAC) function) to for integrity assurance. Additionally, if confidentiality is required, the plaintext file and the MAC can be ciphered using $K_{CIPHER}$ as ciphering key (e.g. with AES cipher) and IV as initialisation vector for the cipher (e.g. if AES is used in Cipher-Block Chaining (CBC) mode of operation).

In step S707, the following attributes may be attached to the output file $C_{FILE}$, in order to allow decryption and MAC verification:
  the salt used for generating the key,
  the random string associated to the file or an identifier that can be mapped to it,
  the IMSI of the (U)SIM 7 used for the encryption process, or an identifier that can be mapped to it, and
  a flag indicating whether the file requires a password to be decrypted.

Figure 15:
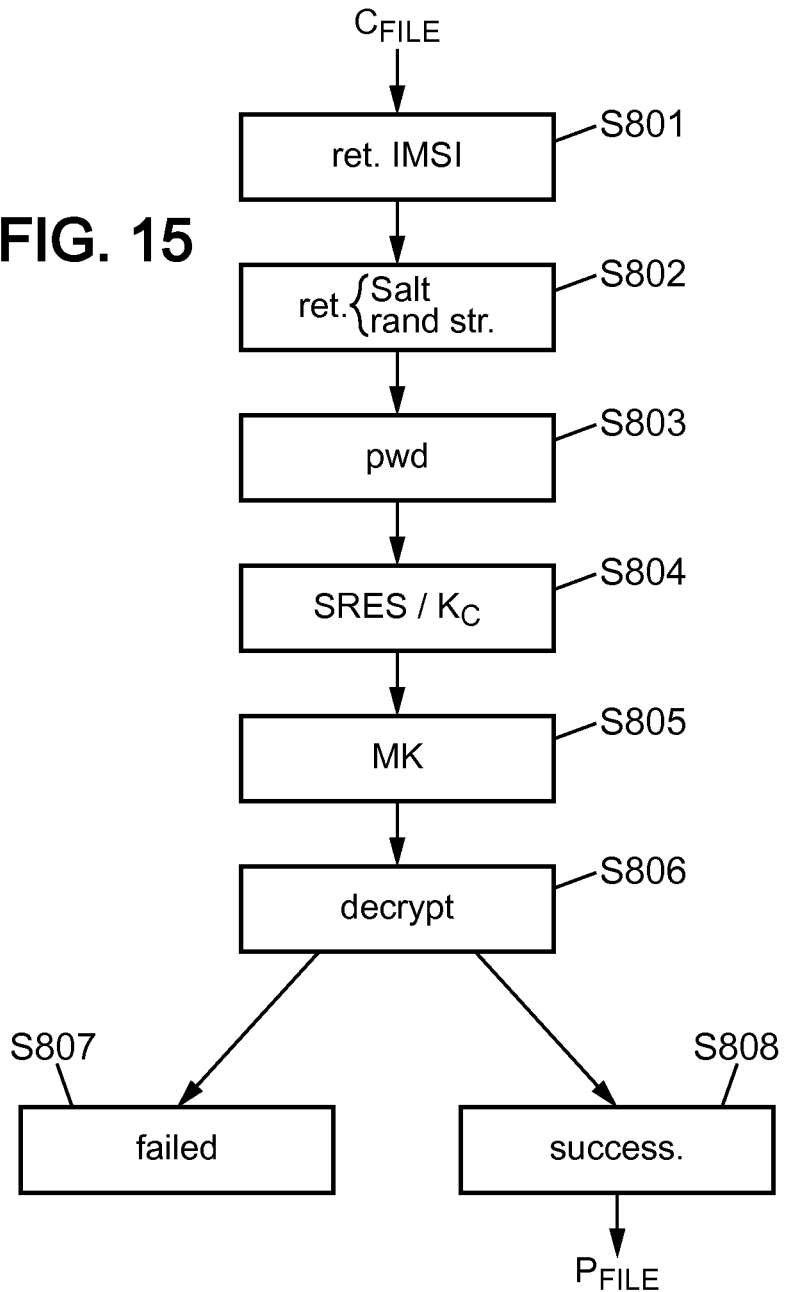
FIG. 15 and FIG. 16 are charts showing steps of a method for verifying the MAC of a ciphered file and/or for decrypting it.
Figure 16:
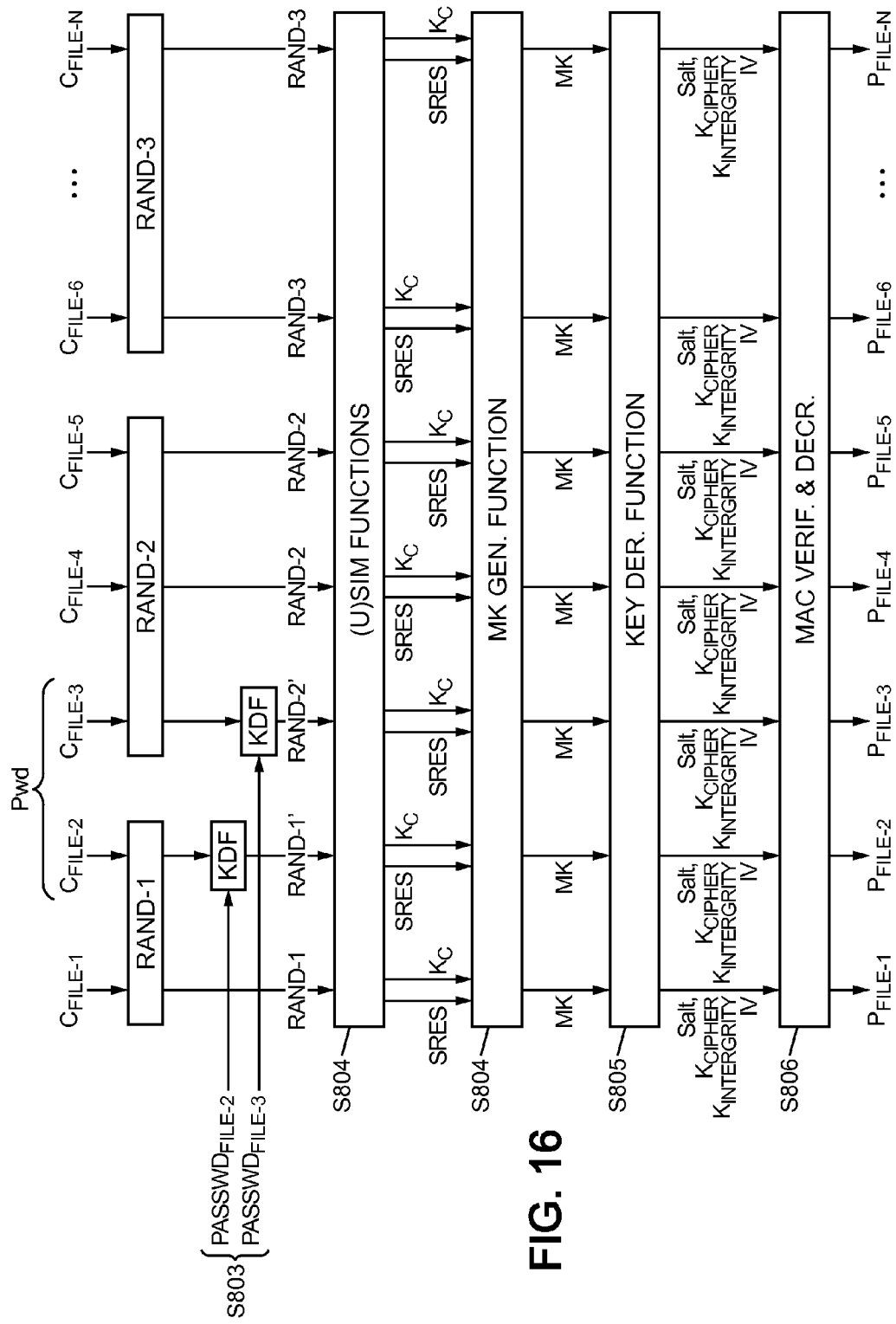

FIG. 15 and FIG. 16 represent the process for verifying the MAC of a ciphered file $C_{FILE}$ and/or for decrypting it.

In step S801, the IMSI of the (U)SIM 7 used to cipher the file is retrieved. If the required (U)SIM 7 is not available, the procedure exits, otherwise the relevant (U)SIM 7 is selected if it is not selected yet.

In step S802, the salt and the 128-bit random string associated to that file $C_{FILE}$ are retrieved.

In step S803, if the file $C_{FILE}$ is protected with a password, the password is provided by the user and it is used to generate the secondary 128-bit random string, in the same way it is used during the encryption process. In the example, files $C_{FILE-2}$ and $C_{FILE-3}$ are protected by a password.

In step S804, this random string is then appended to an AUTHENTICATE or RUN_GSM_ALGO APDU command and sent to the (U)SIM 7 in order to obtain SRES and $K_C$, similarly to the case of the offline authentication described above. SRES and $K_C$ are then fed to a function which generates a master key as function of only those two values. In one embodiment, this function could be the same function used to generate OFFLINE_RESP strings as described above, therefore:

$$MK=H(SRES\|K_C)$$

In step S805, the master key is then fed into a key derivation function together with the salt associated to the file. From this function $K_{CIPHER}$, $K_{INTEGRITY}$ and IV are generated, as described here:

$$K_{CIPHER}=H(SALT\|MK\|RANDSTR\_K_C)$$

$$K_{INTEGRITY}=H(SALT\|MK\|RANDSTR\_K_I)$$

$$IV=H(SALT\|MK\|RANDSTR\_IV)$$

Where RANDSTR_$K_C$, RANDSTR_$K_I$ and RANDSTR_IV are three well-known constant random strings, which are used to differentiate the three outputs above.

In step S806, $K_{CIPHER}$ and IV are used to decrypt the file and $K_{INTEGRITY}$ is used to verify the MAC of the file. If the file has been forged or is damaged, the MAC verification fails (step S807). Otherwise, the decryption is successful (step S808).

A person skilled in the art would recognise that embodiments of this invention can be obviously extended to be used with 3GPP2-compliant mobile devices, where instead of a (U)SIM, a Removable User Identity Module (RUIM) or a CDMA Subscriber Identity Module (CSIM) are used to perform authentication and key exchange between a mobile subscriber and a mobile network.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an"

does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of data processing for securing local resources in a mobile device, the method comprising:
   a) when network connectivity is available:
      coupling the mobile device with a first identity module associated to a first International Mobile Subscriber Identity (IMSI),
      receiving in the first identity module a network challenge from a communication network, ciphering the network challenge using a secret key, and sending a corresponding response to the network for subsequent successful authentication,
   b) after a successful authentication to the communication network:
      associating at least a part of the local resources to the first IMSI, and
      storing, in a database of the mobile device, authentication data related to the challenge/response duplet,
      granting access to local resources associated to the first IMSI,
   c) when network connectivity is not available:
      coupling the mobile device with a second identity module associated to a second IMSI,
      sending a challenge to the second identity module, said challenge being determined from the authentication data stored in the database,
      receiving a response from the second identity module,
      comparing the response received with the stored authentication data, and granting access to local resources associated to the second IMSI if the response received from the second identity module matches a response associated to the sent challenge in the database.

2. The method according to claim 1, wherein step a) comprises a passive collection of authentication data comprising:
   collecting a response from the first identity module, and
   determining, from the response, an offline authentication expected response, step b) comprising storing in the database the network challenge and the corresponding offline authentication expected response.

3. The method according to claim 1, wherein step b) comprises an active collection of authentication data comprising:
   verifying that the first identity module has previously been authenticated by the network,
   sending to the first identity module a challenge determined from the database and collecting the corresponding response,
   determining, from the response, an offline authentication expected response, and
   storing in the database the challenge and the corresponding offline authentication expected response.

4. The method according to claim 1, wherein authentication data stored in the database comprise a set of records, each record comprising:
   an IMSI of an identity module,
   an Integrated Circuit Card ID (ICCID) of the card on which the said identity module is installed,
   a challenge used to generate the authentication data,
   a corresponding offline authentication expected response calculated from a response from the identity module,
   a flag indicating whether a validity of the authentication data is verified against combined identity module and network spoofing attacks,
   a flag indicating whether the authentication data has been collected actively or passively,
   a number of times the challenge has been replayed in offline contexts, and/or
   a timestamp related to the time when the challenge/response duplet has been collected.

5. The method according to claim 4, wherein step c) comprises:
   checking the IMSI of the second identity module, and, if it does not match with an IMSI that needs to be authenticated,
   reading the value of the ICCID of the card on which the second identity module is installed, and, if this ICCID matches with the value of the ICCID of the card on which the requested identity module is supposed to be installed,
   selecting another identity module present on the said card.

6. The method according to claim 1, wherein step a) comprises:
   authenticating the communication network with the mobile device, and
   authenticating the first identity module with the communication network.

7. The method according to claim 1, wherein step a) comprises:
   authenticating the first identity module with the communication network, and
   offline authenticating the first identity module with the mobile device.

8. The method according to claim 1, wherein step c) comprises, if more than one challenge/response duplets are stored in the database:
   selecting in the database all the records where the value of the IMSI matches with the IMSI of the second identity module,
   assigning a security index $S_i$ to each of the selected records, the security index $S_i$ depending on the number of times the record has already been replayed and on the fact that the record has been collected actively or passively,
   sorting all the selected records in descending order of the security index $S_i$, and
   selecting a record to be used according to a probability distribution.

9. The method according to claim 8, wherein the probability distribution has a probability density function equal to:

$$p(i) = \frac{S_i}{\sum_{k=1}^{N} S_k}$$

$$i \in N$$

$$1 \le i \le N \le 10$$

where i=1 corresponds to the first element of the list and i=N corresponds to the last element of the list and $S_i$ is the security index of the element at index i.

10. The method according to claim 1, comprising using an identity module security algorithms in order to generate:
   a cipher key to encrypt/decrypt at least a part of the local resources,
   an integrity key to generate/verify Message Authentication Codes (MAC).

11. The method according to claim 1, wherein at least a part of the local resources is further protected with a password provided by a user.

12. The method according to claim 1, wherein the first identity module (7) and the second identity module are Subscriber Identity Modules (SIM), Universal Subscriber Identity Modules (USIM), Removable User Identity Modules (RUIM), or CDMA Subscriber Identity Modules (CSIM).

13. Method according to claim 1, wherein an IMSI of an identity module to be authenticated is predetermined.

14. The method according to claim 1, wherein an IMSI of an identity module to be authenticated is implicit and corresponds to an IMSI of an identity module selected at the moment the authentication step is initiated.

15. A non-transitory computer readable medium comprising a computer program product stored thereon and comprising one or more stored sequences of instructions that are accessible to a processor and which, when executed by the processor, cause the processor to carry out steps of a method of data processing for securing local resources in a mobile device, the method comprising:
a) when network connectivity is available:
coupling the mobile device with a first identity module associated to a first International Mobile Subscriber Identity (IMSI),
receiving in the first identity module a network challenge from a communication network, ciphering the network challenge using a secret key, and sending a corresponding response to the network for subsequent successful authentication,
b) after a successful authentication to the communication network:
associating at least a part of the local resources to the first IMSI, and
storing, in a database of the mobile device, authentication data related to the challenge/response duplet,
granting access to local resources associated to the first IMSI,
c) when network connectivity is not available:
coupling the mobile device with a second identity module associated to a second IMSI,
sending a challenge to the second identity module, said challenge being determined from the authentication data stored in the database,
receiving a response from the second identity module,
comparing the response received with the stored authentication data, and granting access to local resources associated to the second IMSI if the response received from the second identity module matches a response associated to the sent challenge in the database.

16. A mobile device comprising:
local resources, and
a security manager module configured to secure access to at least a part of the local resources, the mobile device being configured to:
a) when network connectivity is available:
being coupled with a first identity module associated to a first International Mobile Subscriber Identity (IMSI),
receiving in the first identity module a network challenge from a communication network, ciphering the network challenge using a secret key, and sending a corresponding response to the network for subsequent successful authentication,
b) after a successful authentication to the communication network:
associating at least a part of the local resources to the first IMSI, and
storing, in a database of the security manager module, authentication data related to the challenge/response duplet,
granting access to local resources associated to the first IMSI,
c) when network connectivity is not available:
being coupled with a second identity module associated to a second IMSI,
sending a challenge to the second identity module, said challenge being determined from the authentication data stored in the database,
receiving a response from the second identity module,
comparing the response with the stored authentication data, and granting access to local resources associated to the second IMSI if the response received from the second identity module matches the response associated to the sent challenge in the database.

* * * * *